United States Patent
Lang

(10) Patent No.: US 7,517,390 B2
(45) Date of Patent: Apr. 14, 2009

(54) PROCESS FOR ADSORBER REGENERATION

(75) Inventor: Martin Lang, Munich (DE)

(73) Assignee: Linde Aktiengesellschaft, Wiesbaden (DE)

(*) Notice: Subject to any disclaimer, the term of this patent is extended or adjusted under 35 U.S.C. 154(b) by 430 days.

(21) Appl. No.: 11/363,042

(22) Filed: Feb. 28, 2006

(65) Prior Publication Data
US 2006/0199723 A1 Sep. 7, 2006

(30) Foreign Application Priority Data
Mar. 1, 2005 (DE) ............... 10 2005 009 393

(51) Int. Cl.
*B01D 53/02* (2006.01)
*C01B 3/50* (2006.01)

(52) U.S. Cl. .................. 95/139; 95/148; 585/826

(58) Field of Classification Search ............ 95/90, 95/98, 105, 139, 148, 236; 502/20; 208/99, 208/101; 423/220, 230; 585/800, 802, 820, 585/826
See application file for complete search history.

(56) References Cited

U.S. PATENT DOCUMENTS

| | | | | |
|---|---|---|---|---|
| 4,469,665 A | | 9/1984 | Pinto et al. | |
| 4,546,111 A | | 10/1985 | Banquy et al. | |
| 4,752,311 A | * | 6/1988 | MacLean et al. | 62/624 |
| 4,846,851 A | * | 7/1989 | Guro et al. | 95/100 |
| 5,152,975 A | * | 10/1992 | Fong et al. | 423/652 |
| 5,897,686 A | * | 4/1999 | Golden et al. | 95/99 |
| 7,380,413 B2 | * | 6/2008 | Dumont et al. | 62/617 |
| 2003/0113257 A1 | | 6/2003 | Kobayashi et al. | |
| 2003/0126989 A1 | * | 7/2003 | Bancon et al. | 95/96 |

FOREIGN PATENT DOCUMENTS

| | | |
|---|---|---|
| DE | 3914361 A1 | 10/1990 |
| EP | 0289877 A | 11/1988 |
| WO | WO 03/086965 A1 * | 10/2003 |

* cited by examiner

*Primary Examiner*—Frank M Lawrence
(74) *Attorney, Agent, or Firm*—Millen, White, Zelano & Branigan, P.C.

(57) ABSTRACT

The invention relates to a process for regenerating the adsorbers of adsorber stations in the crude gas stream of installations for obtaining gas products from synthesis gas with the aid of a cryogenic gas separation unit. A part-stream from the purified synthesis gas stream, which is taken off downstream of the adsorber station but upstream of its cryogenic separation and is fed to the adsorber to be regenerated, is used as regeneration gas. The laden regeneration gas is either fed back to the crude synthesis gas stream upstream of the $CO_2$ scrub, admixed to a product stream or removed from the installation.

9 Claims, 4 Drawing Sheets

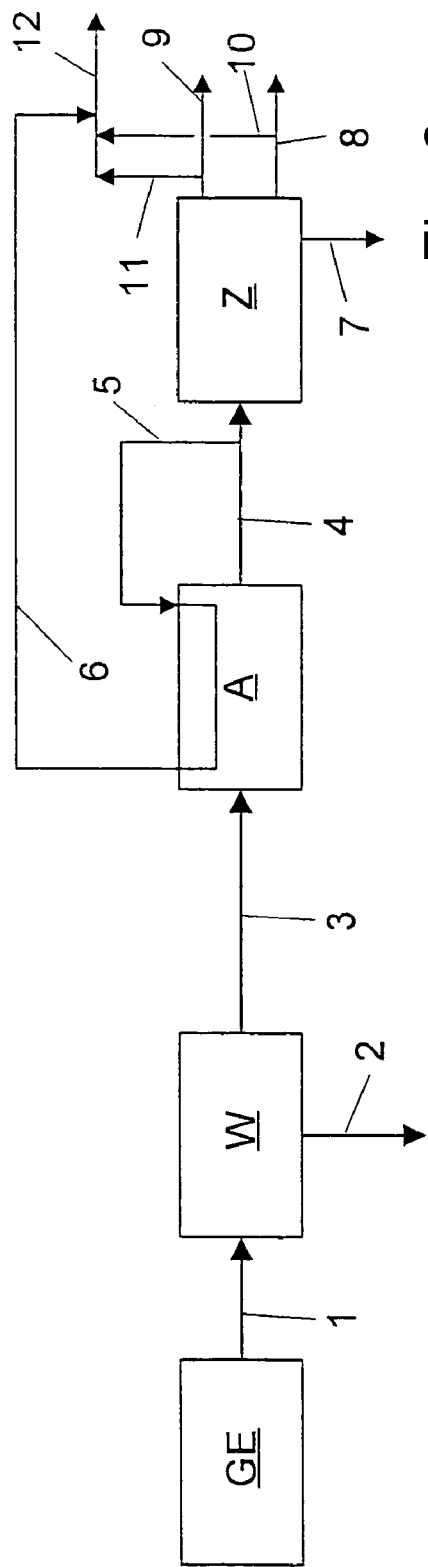
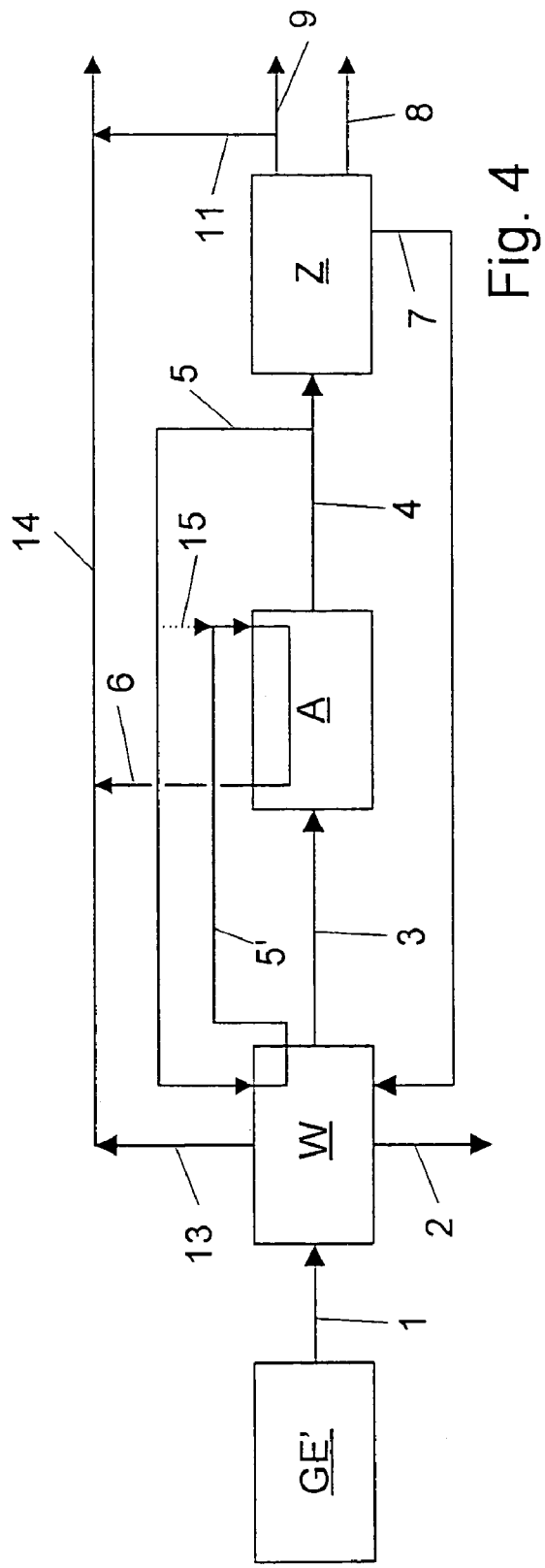

US 7,517,390 B2

PROCESS FOR ADSORBER REGENERATION

FIELD OF THE INVENTION

The invention relates to a process for regenerating the adsorbers in an adsorber station which is used to purify synthesis gas flowing to a cryogenic gas separation unit of a synthesis gas installation.

Synthesis gas is a gas mixture which predominantly comprises hydrogen ($H_2$), carbon monoxide (CO) and methane ($CH_4$); its precise composition depends on the production process and the raw materials used.

The main source of synthesis gas is catalytic steam reforming, in which natural gas, liquefied gas or naphtha are cleaved with the addition of steam. Furthermore, synthesis gas can also be generated economically by the partial oxidation of, for example, heavy oil or coal.

The synthesis gas itself serves as a basic material for a wide range of products, but for this purpose it has to be purified and generally also separated into its main constituents. The majority of the CO obtained in this way is used for the production of formic acid or acetic acid. A further major consumer is the polycarbonate industry, which requires CO of ultrahigh purity for the production of high-purity phosgene. Hydrogen obtained from synthesis gas is used in various hydrogenation processes.

BACKGROUND OF THE INVENTION

To separate the synthesis gas components, industrial installations use in particular the condensation process and the methane scrub; these are both cryogenic processes. A precondition for these processes to be used is for the gas fed to the cryogenic gas separation unit to be free of water, methanol, carbon dioxide ($CO_2$) and other compounds which at the low temperatures used would lead to the formation of solids and therefore to the heat exchangers becoming clogged. Therefore, the crude synthesis gas is subjected to a pre-treatment comprising a plurality of steps, during which it for example passes through a CO conversion and is purified in a $CO_2$ scrub removing the majority of the undesirable substances. The remaining residues are removed by adsorption in a subsequent adsorber station.

The adsorber stations used comprise at least two adsorbers which can be regenerated and each contain at least one adsorber bed (fixed bed of one or more suitable adsorption agents). The pre-purified crude synthesis gas flows through the adsorber bed and as it does so releases the undesirable substances which it contains (e.g. $CO_2$ is still present in amounts of <50 mol ppm) to the adsorption agent(s). After the adsorption time has elapsed, a switch takes place from the adsorber laden with undesirable substances to an unladen adsorber of the adsorber station. The laden adsorber is then regenerated, i.e. is purified so as to remove the substances that it has previously adsorbed.

The capacity of the adsorption agents used is highly temperature-dependent. To regenerate an adsorber, therefore, it is first of all isolated from the synthesis gas stream and then hot regeneration gas flows through it in the opposite direction to the direction of flow of the crude synthesis gas. The substances which are desorbed from the adsorber bed at the elevated temperature are discharged from the adsorber together with the regeneration gas. The regeneration gas laden with the desorbed substances is treated differently depending on its composition.

The regeneration gas used is generally part of the $H_2$ fraction ($H_2$ content>approx. 90 mol %, pressurized) from the cryogenic gas separation unit. If high-purity hydrogen is to be generated as a product in the installation in addition to CO, the laden regeneration gas is cooled, condensate which forms is separated off, the laden regeneration gas is mixed with the remaining $H_2$ fraction and then fed to a pressure swing adsorption (PSA) installation, where high-purity hydrogen is obtained and released as product at the end of the installation, while the remaining substances, which are produced in the residual gas at low pressure (including any CO which may be present) are then fed for undergrate firing. After the regeneration, the adsorber is available again for purifying the crude synthesis gas.

Although the selectivity of the adsorption agents used is high, in addition to the undesirable substances CO— albeit to a lesser extent—is also co-adsorbed and removed from the synthesis gas. If the partial pressure of the carbon monoxide in the regeneration gas is lower than in the crude synthesis gas, some of the adsorbed CO is desorbed during the regeneration. Since in the next adsorption phase (purification of the crude synthesis gas) CO is adsorbed again from the crude synthesis gas, an adsorber regeneration carried out in this way can lead to fluctuations in the composition of the synthesis gas entering the cryogenic gas separation unit and consequently also in the product quantities released at the end of the installation. Moreover, a fluctuating synthesis gas composition can lead to non-steady-state operation of the cryogenic gas separation unit, which under certain circumstances also leads to a reduction in product purity. Since the $H_2$ fraction from the cryogenic gas separation unit which is normally used as regeneration gas has a lower CO content than the synthesis gas, this procedure gives rise to the negative phenomena which have been described above.

At the moment at which the crude synthesis gas stream is switched over to a freshly regenerated adsorber, the latter is still full of regeneration gas, which is displaced by the crude synthesis gas and transported into the cryogenic gas separation unit. If the regeneration gas has a different composition from the crude synthesis gas (for example in the case of regeneration using nitrogen ($N_2$)), undesirable fluctuations in product quality can occur at least for a short time.

The residual gas fraction (mixture of various gases) produced in the cryogenic gas separation unit is generally not sufficient in quantitative terms to be sufficient to regenerate the adsorbers on its own. One technical solution involves increasing the residual gas quantity by admixing some of the $H_2$ fraction. Since the residual gas fraction is at only a low pressure, the admixed $H_2$ fraction as product is lost, and only its calorific value can be exploited. On account of the low pressure of the residual gas, it is necessary, before the synthesis gas is switched over to the freshly regenerated adsorber, for the latter firstly to be pressurized again using synthesis gas, which once again means fluctuations in product quantities and additional time. A corresponding reduction in pressure has to be carried out for the laden adsorber before the regeneration begins.

If the $H_2$ fraction from the cryogenic gas separation unit can be released directly as product hydrogen, as is the case for example for the $H_2$ fraction from the methane scrub, which comprises approx. 99 mol % hydrogen with a CO content of less than 10 mol ppm, this fraction likewise cannot be used for regeneration, since it is not permissible for the $H_2$ product to be contaminated with CO. Furthermore, the use of the $H_2$ fraction as regeneration gas gives rise to additional pressure loss so that an additional compressor may have to be used for the entire $H_2$ quantity in order to reach the desired $H_2$ product release pressure.

The use of product $H_2$ or nitrogen which has to be supplied from outside the installation as regeneration gas is possible but constitutes a considerable cost factor. Furthermore, the use of $N_2$ as regeneration gas can lead to an undesirably high nitrogen content in the Co product, at least for a short time. To prevent this, the freshly regenerated adsorber can be purged with synthesis gas before the crude gas is switched to this adsorber, but this again leads to losses and to a drop in product quantities.

While a synthesis gas installation is being started up, there is no gas or only an insufficient amount of gas available from the cryogenic gas separation unit for use as regeneration gas. In this case too, it is possible to use external $N_2$ or product $H_2$ as regeneration gases, but once again with the economic drawbacks which have been described above.

OBJECT OF THE INVENTION

Therefore, it is an object of the present invention to configure a process of the type described in the introduction in such a way that the product quality and product quantity are not impaired by the regeneration of the adsorbers and the adsorbers themselves can be regenerated without the use of external or product gas if there is no gas or insufficient gas available from the cryogenic gas separation unit as regeneration gas.

According to the invention, this object is achieved by virtue of the fact that a part-stream is removed from the purified synthesis gas stream downstream of the adsorber station but upstream of its cryogenic separation, and this part-stream is returned to the adsorber station as regeneration gas for regenerating the adsorbers, with the result that the regeneration gas has substantially the same composition as the synthesis gas stream that is to be purified.

The synthesis gas which is returned as regeneration gas is firstly heated and passed through the adsorber(s) to be regenerated counter to the direction of flow of the crude synthesis gas to be purified, and in the adsorber(s) it is enriched with the substances that are desorbed at the elevated temperature. Then, the adsorber(s) is/are cooled back down to operating temperature using cold regeneration gas. Since regeneration gas and crude synthesis gas have virtually identical compositions and the CO partial pressures in the two gases do not differ significantly, in the subsequent adsorption phase (purification of the crude synthesis gas), neither co-adsorption of carbon monoxide nor a change in the synthesis gas composition caused by the need to flush out a quantity of regeneration gas in the adsorber(s) occur, and therefore the fluctuations in product quality and product quantity described above also do not occur.

According to the invention, the regeneration gas laden with desorbed substances is returned upstream of the $CO_2$ scrub and at this point fed into the crude synthesis gas stream. Consequently, it is not lost to the process. In the $CO_2$ scrub, a large proportion of the substances that have been desorbed during the adsorber regeneration is removed again, and consequently there is no increase in the amount of the corresponding components in the crude synthesis gas stream.

A compressor is expediently used to return the regeneration gas. Various configurations of the process according to the invention provide for the compressor to be arranged upstream or downstream of the adsorber station in the regeneration gas line or upstream or downstream of the $CO_2$ scrub in the synthesis gas line.

The process according to the invention with the laden regeneration gas being returned upstream of the $CO_2$ scrub can be used both during normal operation and during start-up operation of a synthesis gas installation.

If oxo gas (mixture of $H_2$ and CO with a $H_2$:CO ratio of approx. 1:1) or methanol synthesis gas is generated as product in the synthesis gas installation, a variant of the process according to the invention provides for the laden regeneration gas not to be returned upstream of the $CO_2$ scrub, but rather to be fed into the oxo gas or methanol synthesis gas product. If the difference between the pressure at the location at which the synthesis gas used as regeneration gas is removed and the pressure of the corresponding product is sufficient to compensate for the pressure losses in the adsorber station and the pipelines, it is possible to dispense with the installation of a regeneration gas compressor.

A Rectisol scrub which operates at low temperatures (approx. $-40°$ C.) is preferably used to purify crude synthesis gas originating from a partial oxidation of coal or oil. If methanol synthesis gas is generated from the crude synthesis gas together with CO (and $H_2$), it is possible, depending on the product ratios, for at least part of the crude synthesis gas to pass through a CO conversion beforehand. The adsorber station which follows the Rectisol scrub is preferably operated at a cold temperature (increased capacity of the adsorption agents used) in order to minimize the size of the adsorbers. One configuration of the process according to the invention provides for the synthesis gas, after it has left the adsorber station, to be returned to the Rectisol scrub to recover its refrigeration content, where it is preferably warmed against the crude synthesis gas flowing into the Rectisol scrub before being passed on into the cryogenic separation unit. This is appropriate in particular if the energy demand which is saved in the Rectisol scrub (external refrigeration, compressor power) outweighs the outlay entailed by a higher entry temperature to the cryogenic gas separation unit. The fact that at an elevated entry temperature to the cryogenic gas separation unit the products formed from the cryogenic gas separation unit do not have to be warmed separately, externally (e.g. in coiled heat exchangers in the Rectisol scrub), which causes increased pressure losses, but rather can be released directly to the customer or, as in the case of the CO product, can be fed direct to product compression, also argues in favour of warming the purified synthesis gas in the Rectisol scrub. For adsorber regeneration, some of the warm synthesis gas is branched off, and the remaining temperature increases carried out with the aid of a steam heater or electrical heater. To cool the adsorbers back to their operating temperature following the regeneration, according to the invention a part-stream of the cold synthesis gas is fed to the adsorber station without being warmed in the Rectisol scrub.

If an increased entry temperature to the cryogenic gas separation unit is not acceptable (for example because the process does not have an excess of refrigeration, no external refrigeration is available or because this would require an expansion turbine), the purified synthesis gas, following the adsorber station, is fed direct to the cryogenic gas separation unit. With this form of connection, the cold separation products from the cryogenic gas separation unit are warmed to ambient temperature before they are passed into the Rectisol scrub. A further configuration of the process according to the invention provides for the part-stream of the synthesis gas which is intended for the adsorber regeneration to be returned to the Rectisol scrub, where it is preferably warmed against the crude synthesis gas flowing into the Rectisol scrub before it is passed into the adsorber station and brought the temperature required for regeneration with the aid of a steam heater or electrical heater. To cool the adsorbers again following their regeneration, according to the invention the part-stream of the cold synthesis gas is fed to the adsorber station without being warmed in the Rectisol scrub.

In the case of synthesis gas installations which inter alia also produce methanol synthesis gas, a further configuration of the process according to the invention provides for the residual gas from the cryogenic gas separation unit to be put to economic use by being returned to the crude synthesis gas via the recycled gas compressor of the Rectisol scrub. If this involves a two-train Rectisol scrub (two-absorber concept), the recycle stream is preferably fed into the crude synthesis gas stream from the CO conversion and therefore fed from the scrub direct to the methanol synthesis gas.

In synthesis gas installations which generally use regeneration gas from the cryogenic gas separation unit, the process according to the invention is expediently used at least during start-up operation, when no gas or insufficient gas can be obtained from the cryogenic gas separation unit. In this case, the synthesis gas following the adsorber regeneration is not generally returned upstream of the $CO_2$ scrub, but rather is used as fuel gas or added to the flare. There is no need for a regeneration gas compressor, since a sufficient pressure drop is available. Alternatively, the regeneration gas can also be fed into a pressure swing adsorption (PSA) installation in order to obtain pure hydrogen.

BRIEF DESCRIPTION OF DRAWINGS

FIG. 3 is a flow diagram illustrating another embodiment of the invention.

FIG. 4 is a flow diagram illustrating another embodiment of the invention.

DETAILED DESCRIPTION OF THE INVENTION

In the text which follows, the process according to the invention is to be explained in more detail with reference to the exemplary embodiments which are diagrammatically depicted in FIGS. 1 to 6. In the figures, identical symbols in each case denote identical installation parts or lines in which identical substances are transported.

Figure 1:
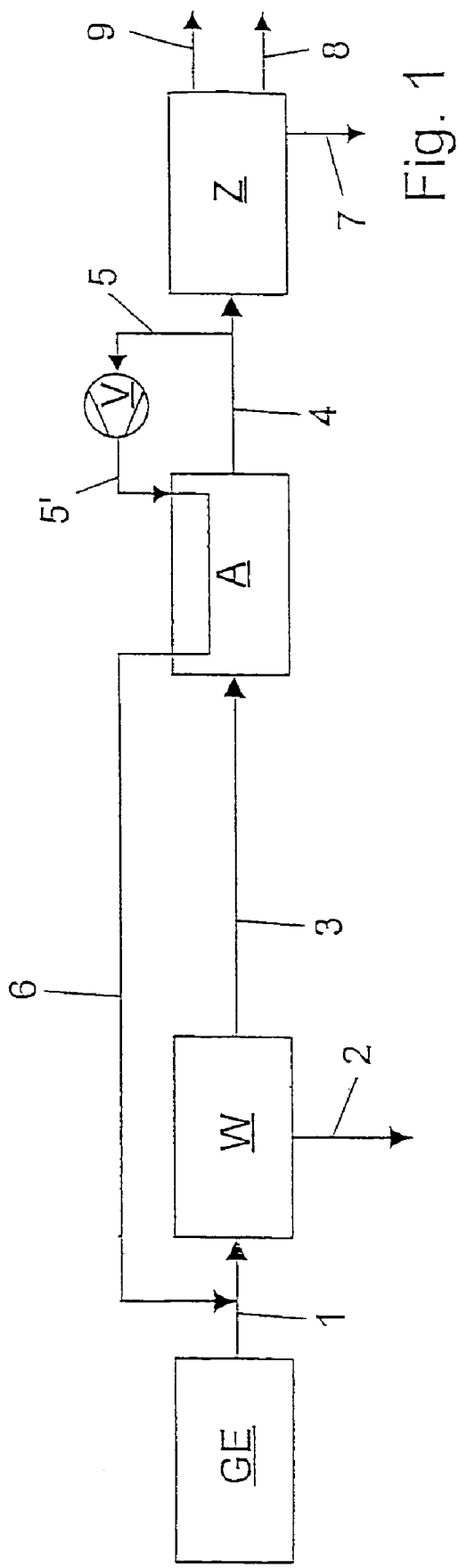
FIG. 1 is a flow diagram illustrating an embodiment of the invention.

FIG. 1 diagrammatically depicts the process according to the invention, in which a compressor in the regeneration gas line is used to return the laden regeneration gas upstream of the $CO_2$ scrub.

The crude synthesis gas coming from the synthesis gas generation GE is fed to the $CO_2$ scrub W via line 1. There, the majority of the $CO_2$—but also of other undesirable substances—is scrubbed out and removed from the process via line 2. Via line 3, the crude synthesis gas passes into the adsorber station A, where the remaining residues of undesirable substances are removed before it is passed via line 4 into the cryogenic gas separation unit Z. The residual gas fraction from Z is added to a flame via line 7, while the CO fraction and the $H_2$ fraction are passed onwards via the lines 8 and 9.

A part-stream is removed from the purified synthesis gas stream and returned via lines 5 and 5' to the adsorber station A as regeneration gas, where, after heating in a steam heater or electrical heater (not shown), it flows through an adsorber that is to be regenerated, where it is enriched with the desorbed substances (in particular $CO_2$ and water). Then, the laden regeneration gas is returned via line 6 to upstream of the $CO_2$ scrub W and mixed with the crude synthesis gas stream in line 1. The synthesis gas used as regeneration gas is therefore passed in a circuit and in this way remains in the process.

The pressure at the location at which the regeneration gas is removed downstream of the adsorber station A is lower than upstream of the $CO_2$ scrub W. To enable the synthesis gas used as regeneration gas to be returned upstream of the $CO_2$ scrub W, this pressure difference and the pressure loss along the regeneration gas path have to be compensated for. For this purpose, a compressor V is installed in the regeneration gas line upstream of the adsorber station A.

Figure 2:
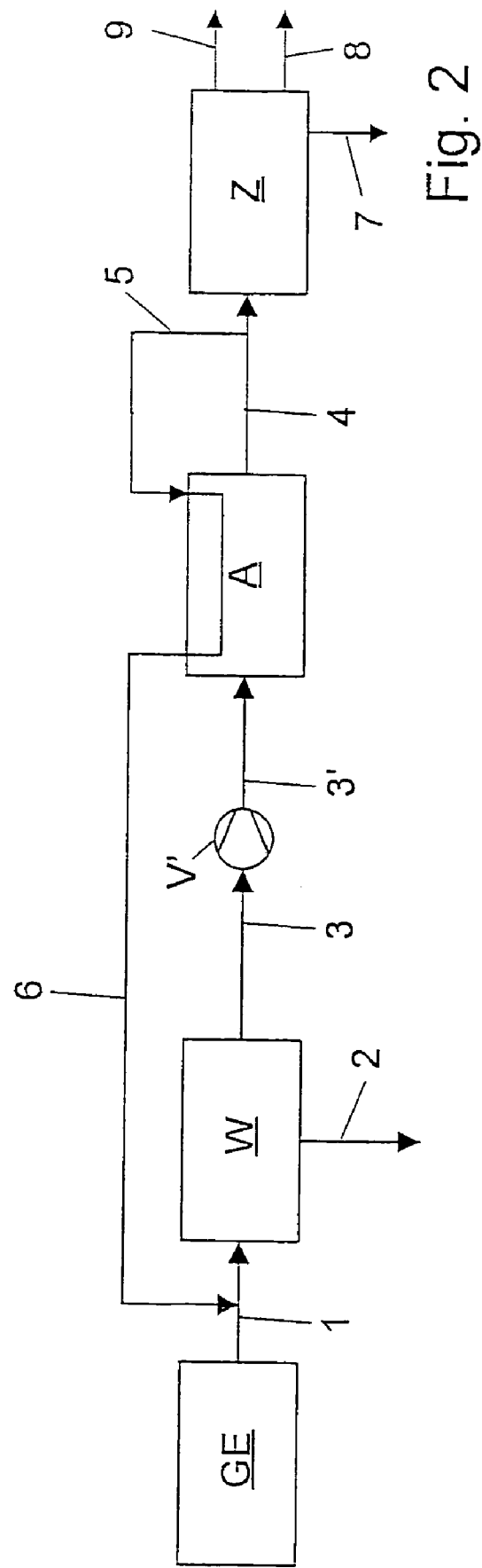
FIG. 2 is a flow diagram illustrating another embodiment of the invention.

Another variant of the process according to the invention is diagrammatically depicted in FIG. 2. The only difference from the variant illustrated in FIG. 1 lies in the arrangement of the compressor V' in the crude synthesis gas stream, with the crude synthesis gas flowing to this compressor V' via line 3 and the compressor then passing it onwards to the adsorber station A via line 3'.

FIG. 3 diagrammatically depicts the case of a synthesis gas installation in which oxo gas is generated as a product in addition to CO and $H_2$. For this purpose, part-streams of the CO fraction and of the $H_2$ fraction are branched off via the lines 10 and 11 and mixed in line 12 to form oxo gas. The synthesis gas which is removed from the synthesis gas stream via line 5, is used as regeneration gas and is laden with the substances desorbed in the adsorber station A, is fed via line 6 to line 12, where it is admixed with the oxo gas product. The pressure drop between the synthesis gas and the oxo gas product is sufficiently high for it to be possible to dispense with a compressor for transporting the regeneration gas.

FIG. 4 diagrammatically depicts the case of a synthesis gas installation in which methanol synthesis gas is generated as a product in addition to CO and $H_2$. The crude synthesis gas, which is generated in GE' and, depending on the product ratios, is at least partially subjected to CO conversion, passes via line 1 to the $CO_2$ scrub W, which is implemented as a Rectisol scrub and operates at approx. −40° C. A part-stream of the crude synthesis gas (which has been treated in the scrub) is branched off from W via line 13 and mixed with a part-stream of the $H_2$ fraction, which is supplied via line 11, in line 14 to form methanol synthesis gas. The regeneration gas which is removed from the synthesis gas stream via line 5 is returned to the $CO_2$ scrub W, where it is warmed against the crude synthesis gas flowing in via line 1 and passed into the adsorber station A via line 5' in order to regenerate the adsorbers. The laden regeneration gas flows out via line 6 and is admixed with the methanol synthesis gas in line 14. For an adsorber to be cooled again after its regeneration, the regeneration gas stream via line 5' is interrupted, and instead synthesis gas which is not warmed in the Rectisol scrub is fed to the adsorber via line 15. The residual gas from the cryogenic gas separation unit Z is returned to the $CO_2$ scrub W via line 7, and in the $CO_2$ scrub W is compressed into the crude synthesis gas by a recycled gas compressor (not shown) and finally fed via line 13 into the methanol synthesis gas.

Figure 5:
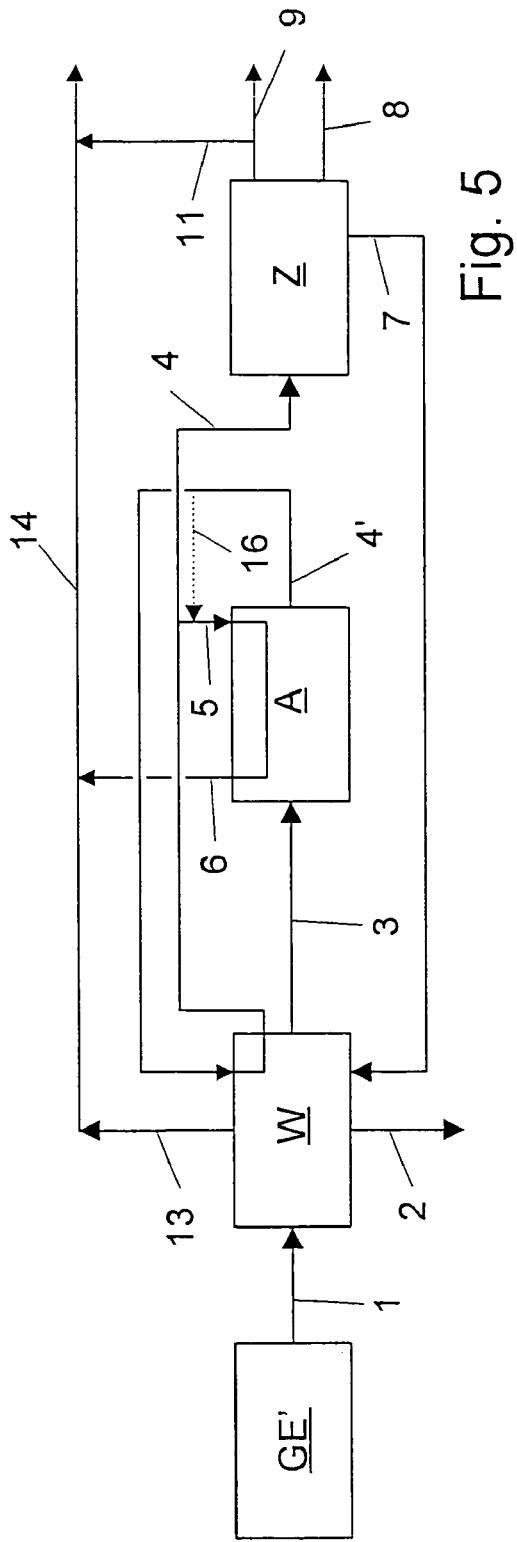
FIG. 5 is a flow diagram illustrating another embodiment of the invention.

FIG. 5 likewise diagrammatically depicts a synthesis gas installation in which methanol synthesis gas is generated as a product in addition to CO and $H_2$. The purified synthesis gas is returned to the $CO_2$ scrub via line 4' and warmed against the crude synthesis gas flowing in via line 1 before it is passed onwards into the cryogenic gas separation unit Z via line 4. A part-stream is branched off from the warmed synthesis gas via line 5 and fed to the adsorbers in the adsorber station A. The laden regeneration gas flows out via line 6 and is admixed with the methanol synthesis gas in line 14. For the adsorbers to be cooled again after their regeneration, the regeneration gas stream via line 5 is interrupted and instead synthesis gas which is not warmed in the $CO_2$ scrub is supplied via line 16.

Figure 6:
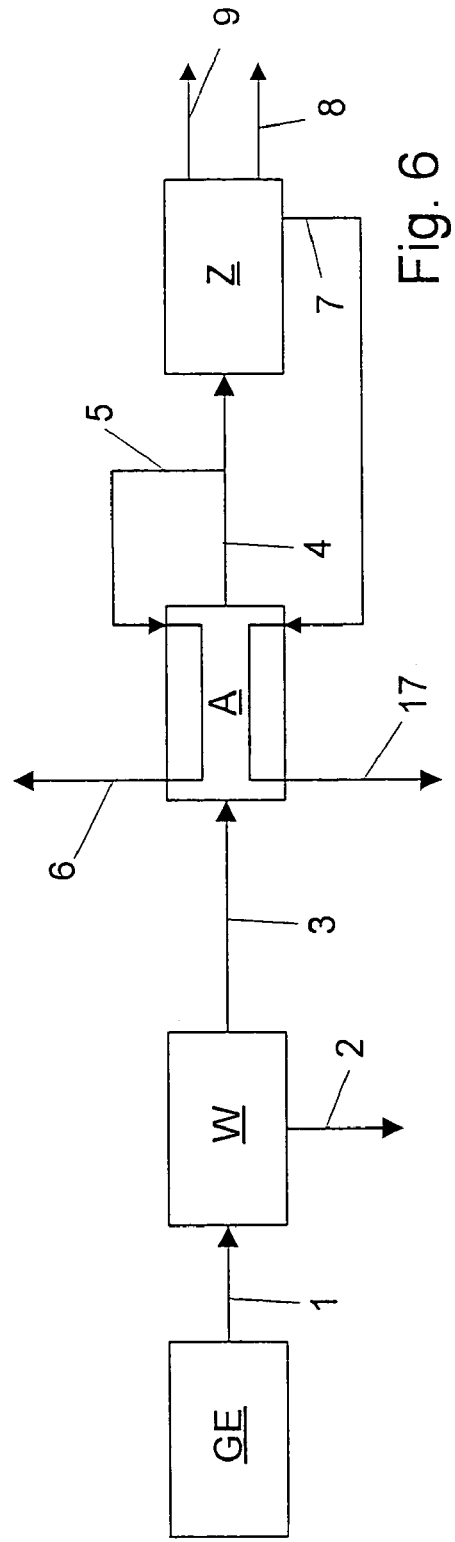
FIG. 6 is a flow diagram illustrating another embodiment of the invention.

FIG. 6 sketches a process variant which enables the adsorbers to be regenerated during start-up operation, when no standard regeneration gas or insufficient standard regeneration gas, which is supplied from the cryogenic gas separation unit Z via line 7 and is discharged in laden form via line 17, is available for the regeneration of the adsorbers. The purified synthesis gas removed via line 5 is passed through the adsorber station as regeneration gas. The laden regeneration gas is discharged via line 6 and used as fuel gas or added to the flame. Alternatively, the laden regeneration gas can also be passed into a pressure swing adsorption (PSA) installation in order to obtain pure hydrogen.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102005009393.0, filed Mar. 1, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for regenerating adsorbers in an adsorber station (A), which is used to purify a synthesis gas (3) flowing to a cryogenic gas separation unit (Z) of a synthesis gas installation, in which an oxo gas product (12) or a methanol synthesis gas (14) is obtained from said cryogenic gas separation unit (2), wherein a part-stream (5) is removed from the purified synthesis gas stream (4) downstream of an adsorber station (A) but upstream of said cryogenic gas separation unit (Z), and said part-stream (5) is returned to the adsorber station (A) as regeneration gas for regenerating the adsorbers, characterized in that the part-stream of synthesis gas (6) used as regeneration gas, after having passed through the adsorber(s) to be regenerated, is admixed with the oxo gas product (12) or the methanol synthesis gas (14).

2. A process according to claim 1, said process being conducted in installations, in which methanol synthesis gas (14) is generated cryogenically from part of the purified synthesis gas, and a part of the synthesis gas (4'), following purification in the adsorber station (A), is returned to a $CO_2$ scrub (W).

3. A process according to claim 2, characterized in that a part-stream (16) is removed from the synthesis gas stream (4) downstream of the adsorber station (A) but upstream of the $CO_2$ scrub (W) and is passed to the adsorbers of the adsorber station (A) downstream of the regeneration in order to cool said adsorbers and then the resultant warmed part-stream (16) is fed into the methanol synthesis gas (14).

4. A process according to claim 1, being conducted in installations in which methanol synthesis gas is generated, the regeneration gas (5) is returned to the $CO_2$ scrub (W), is thereafter warmed against the crude synthesis gas (1) to be cooled, the adsorbers of the adsorber station (A) are regenerated with resultant warmed regeneration gas which is then fed into the methanol synthesis gas (14).

5. A process according to claim 4, characterized in that cold synthesis gas (15), which is not warmed in the $CO_2$ scrub (W) is fed into the methanol synthesis gas (14), is then passed in heat exchange contact with the adsorbers of the adsorber station (A) so as to cool the adsorbers after the regeneration.

6. A process according to claim 1, being conducted in synthesis gas installations which utilize gas from a cryogenic gas separation unit as regeneration gas, a part-stream of the synthesis gas is used as regeneration gas, with the synthesis gas after is has passed through the adsorber(s) to be regenerated is used as fuel gas or is added to a flare, or is passed into a pressure swing adsorption (PSA) installation to separate hydrogen.

7. A process according to claim 2, wherein the synthesis gas (4') returned to the $CO_2$ scrub is warmed against the crude synthesis gas (1) to be cooled and then passed to the cryogenic gas separation unit (Z), with a part-stream (5) being removed from the warmed synthesis gas stream (4) downstream of the $CO_2$ scrub (W) but upstream of its cryogenic separation (Z), and said part-stream is passed as regeneration gas for regenerating the adsorbers of the adsorber station (A), and resultant laden regeneration gas (6) is then fed into the methanol synthesis gas (14).

8. A process according to claim 6, wherein the synthesis gas after passing through the adsorbers to be regenerated is passed to a pressure swing adsorption (PSA) to separate hydrogen.

9. A process according to claim 6 is conducted during start-up.

* * * * *